(12) United States Patent
Satyanarayanan et al.

(10) Patent No.: US 8,995,635 B1
(45) Date of Patent: Mar. 31, 2015

(54) AUTOMATIC ROOM RESCHEDULING

(75) Inventors: Ottalingam Satyanarayanan, Karnataka (IN); Sachin Saswade, Milpitas, CA (US); Todd Lizambri, Frederick, MD (US)

(73) Assignee: Cisco Technology, Inc., San Jose, CA (US)

( * ) Notice: Subject to any disclaimer, the term of this patent is extended or adjusted under 35 U.S.C. 154(b) by 1500 days.

(21) Appl. No.: 12/356,024

(22) Filed: Jan. 19, 2009

(51) Int. Cl.
H04M 3/42 (2006.01)

(52) U.S. Cl.
USPC .................................. 379/202.01

(58) Field of Classification Search
USPC ............... 379/202.01; 370/260; 455/416
See application file for complete search history.

(56) References Cited

U.S. PATENT DOCUMENTS

| | | | | |
|---|---|---|---|---|
| 2003/0021400 | A1* | 1/2003 | Grandgent et al. | 379/202.01 |
| 2003/0039216 | A1* | 2/2003 | Sheldon et al. | 370/260 |
| 2005/0084086 | A1* | 4/2005 | Hesse | 379/202.01 |
| 2006/0062367 | A1* | 3/2006 | Christenson et al. | 379/202.01 |
| 2006/0256738 | A1* | 11/2006 | Kenoyer et al. | 370/260 |
| 2008/0253548 | A1* | 10/2008 | Mahalingam | 379/202.01 |
| 2009/0210271 | A1* | 8/2009 | Abrams | 705/7 |
| 2010/0085417 | A1* | 4/2010 | Satyanarayanan et al. | 348/14.08 |

OTHER PUBLICATIONS

Recommendation ITU-R BT.500-11; "Methodology for the subjective assessment of the quality of television pictures" (Questions ITU-R 211/11), (1974-1978-1982-1986-1990-1992-1994-1995-1998-1998-2000-2002) pp. 1-48.

MSU Graphics and Media Lab (Video Group), "MSU Perceptual Video Quality Tool, MSU Perceptual Video Quality: Subjective video quality methods information", Description of Methods of subjective video quality evaluation, retrieved from : http://compression.ru/video/quality_measure/subjective_metrics_info_en.html, 6 pages, print date: Apr. 16, 2009.

OPTICOM, "PEVQ-Perceptual Evaluation of Video Quality," Video Quality Measurement, OPTICOM, retrieved from: http://www.pevq.org/video-qulaity-measurement.html, 1 page, print date Apr. 16, 2009.

* cited by examiner

*Primary Examiner* — Oleg Asanbayev
(74) *Attorney, Agent, or Firm* — Hickman Palermo Becker Bingham LLP

(57) ABSTRACT

Automatic room rescheduling is described. In an embodiment, an apparatus receives status data regarding status of communications resources capable of use in a teleconference call at a first teleconference location. The apparatus determines that a status of one or more of the communications resources might negatively affect the teleconference call. The apparatus receives availability data about other available communications resources and teleconference locations. Based on at least the status data and the availability data, the apparatus reschedules the teleconference call for a second teleconference location. The apparatus communicates information about the rescheduling and identifies the second teleconference location to one or more teleconference call participants. In other embodiments, the invention encompasses a method and a computer-readable medium configured for carrying out the method steps.

15 Claims, 5 Drawing Sheets

AUTOMATIC ROOM RESCHEDULING

TECHNICAL FIELD

The present disclosure generally relates to scheduling rooms used for teleconferencing.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Video conferencing is quickly becoming a business critical service that is relied upon by organizations to reduce travel expenses but continue to conduct business with a "face-to-face" experience. In the past, business critical meetings were always conducted in person, but as the availability and cultural acceptance of conducting business via video conference technology becomes more pervasive, conducting business over high quality communication links is quickly becoming the choice mode of conducting business. High quality video conferencing solutions are offered by Cisco Systems, Inc. under the brand name TELEPRESENCE.

With this technology, participants in a meeting are located at different geographical locations and communicate with each other via high quality audio and video links, such as high definition video. The communication links are part of a deployment formed over a communications network. The participants may be located in different time zones or even different countries. A meeting is essentially a teleconference call where each of the parties participating in the teleconference call can communicate remotely with each other at specially equipped teleconference locations. Usually a designated room at each geographical location is specially equipped to provide high quality audio and video links, and participants of the teleconference call gather at the designated room of each geographical location to use the specialized equipment to participate in the teleconference call.

Unfortunately, as with any new technology, problems can arise that cannot easily be prevented. Some technical issues may render the meeting resources unusable or potentially providing an unacceptable quality for the meeting which is scheduled to take place. Participants of the meeting might waste valuable time trying to fix the technical problems, or trying to find an alternative method of participating in the meeting, or give up altogether. Business priorities may change and a new room location may be needed due to changes in the priorities or personal travel schedules.

DESCRIPTION OF EXAMPLE EMBODIMENTS

Figure 1:
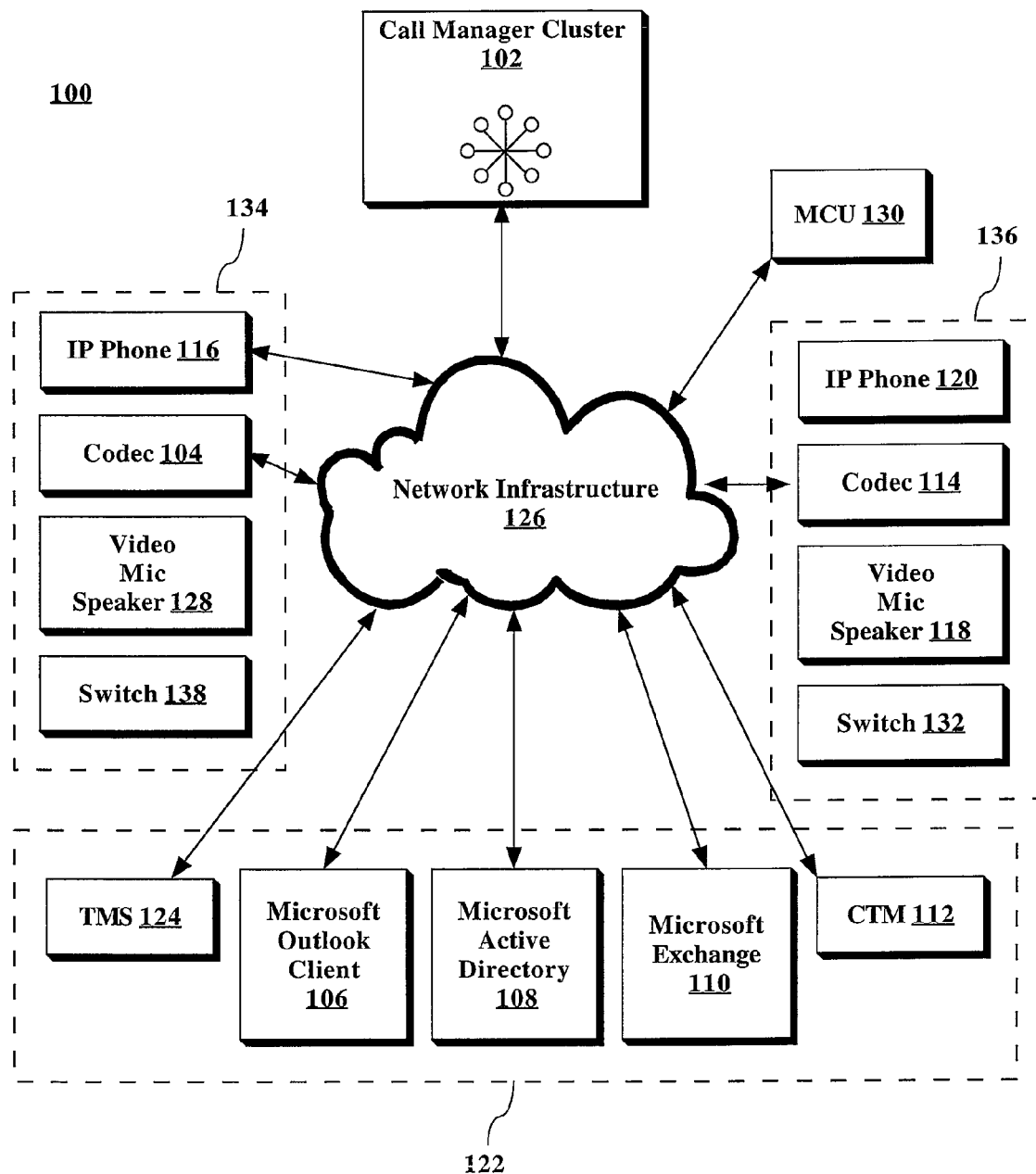
FIG. 1 illustrates an example of a teleconferencing system utilizing automatic room rescheduling.

Automatic room rescheduling for teleconference meetings such as video conferences is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
   2.0 Structural and Functional Overview
      2.1 Operational Issues
      2.2 Quality Issues
      2.3 Teleconference Management System with Automatic Room Scheduling
      2.4 Monitoring And Management
         2.4.1 Performance Data
         2.4.2 Resource Availability Information
         2.4.3 Room Location and Size Information.
         2.4.4 Participant Profile Information
      2.5 Rescheduling Process Examples
      2.6 Pseudocode for rescheduling process example
   3.0 Implementation Mechanisms—Hardware Overview
   4.0 Extensions and Alternatives

1.0 GENERAL OVERVIEW

Automatic room rescheduling for teleconference meetings such as video conferences is described. In an embodiment, a computer apparatus receives status data regarding the status of communications resources capable of use in a teleconference call at a first teleconference location. The apparatus determines that a status of one or more of the communications resources might negatively affect the teleconference call. The apparatus receives availability data about other available communications resources and other teleconference locations. Based on at least the status data and the availability data, the apparatus reschedules the teleconference call for a second teleconference location. The apparatus communicates information about the rescheduling and identifies the second teleconference location to one or more teleconference call participants.

In an embodiment, the apparatus also retrieves participant information identifying work locations of the participants; and performs the rescheduling using the participant information. In an embodiment, the apparatus also retrieves meeting data identifying other meetings that are scheduled as temporally adjacent to the teleconference call; and uses the meeting data in the rescheduling to select the second teleconference location. In an embodiment, the apparatus also retrieves entitlement data specifying whether the participants are entitled to use particular teleconference locations; and in the rescheduling, if no locations are available for the teleconference call at a particular time, uses the entitlement data to determine whether the participants are required to select a different time.

In an embodiment, the determining further comprises executing synthetic test calls to test the communications resources. In an embodiment, the availability data further includes status indicators for microphones, video screens, and speakers of the available teleconference locations. In an embodiment, the determining further comprises monitoring ongoing teleconference calls for quality conditions and error conditions.

In an embodiment, the apparatus also receives, from an online mapping system, location data for the first teleconference location and the other teleconference locations; and in the rescheduling, selects the second teleconference location based on a shortest distance between the first teleconference location and the other teleconference locations. In an embodiment, the rescheduling further comprises using a number of the teleconference participants in the rescheduling. In an embodiment, the apparatus also communicates dial-in information to the participants when the rescheduling occurs close to a starting time of the teleconference call.

In embodiment, the teleconference call is a video teleconference and the first teleconference location is a first video teleconference room and the second teleconference location is a second video teleconference room.

In other embodiments, the invention encompasses a method to carry out the method steps described herein and a computer-readable medium configured to allow carrying out the method steps described herein.

2.0 STRUCTURAL AND FUNCTIONAL OVERVIEW

Embodiments may be used with teleconferencing technology such as video conferencing systems or voice-only conferencing systems. Cisco TelePresence technology, commercially available from Cisco Systems, Inc., is one example of teleconferencing technology, but embodiments may be used in many other contexts and use with Cisco TelePresence systems is not required.

Due to the high cost of deployment of some teleconferencing rooms, in many buildings there is only one teleconferencing room. The teleconferencing rooms are often heavily used. Since meetings often involve many participants, or participants in different time zones, or critical business meetings, or meetings with customers, or cross-country meetings, rescheduling meetings for meeting participants can present serious technical and logistical challenges.

In an embodiment, a Teleconference Management System (TMS) comprises a special-purpose computer or computer-implemented logic that is configured to determine, in scheduling a teleconferencing meeting, the technological requirements for successfully participating in the meeting are met with respect to each teleconference location. In an embodiment, the TMS ensures that there are sufficient communication resources in a scheduled room to hold a teleconferencing meeting. In this context, "sufficient communication resources" may include, but is not limited to, an adequate number of functional signal coder-decoders (codecs), routers, video displays, microphones, and speakers, for maintaining a teleconferencing experience of a certain threshold quality. The communication resources may also include all network devices and network infrastructure which may be used for the meeting, including servers and services.

In an embodiment, the TMS hosts a Teleconference Rescheduling System (TRS) that performs such scheduling services. In an embodiment, the TRS performs tests and diagnostics to ensure the video and audio quality of scheduled teleconferencing meetings, and automatically reschedules meetings if necessary due to operational issues or quality issues. In an embodiment, the TRS may be implemented separately from the TMS.

The rescheduling techniques described herein are also applicable to other teleconferencing technology where scheduling meetings is desired. In an embodiment, a teleconferencing deployment having lower quality audio or video links may apply rescheduling techniques as described herein. Such a teleconferencing deployment may utilize low quality audio and video links, or utilize only audio links. Embodiments of the invention may also use different products from different vendors.

2.1 Operational Issues

In an embodiment, rescheduling a teleconferencing meeting room is performed automatically in response to detecting one or more operational issues that indicate that holding the meeting as originally scheduled is undesirable. Examples of operational issues are now described.

Malfunctions may cause equipment at a teleconferencing location to be disconnected from the network infrastructure underlying a teleconferencing deployment. In an embodiment, the TMS determines whether participants can successfully execute a teleconferencing meeting by examining the functional status of required elements in the teleconferencing deployment. In an embodiment, one or more video monitors, microphones, speakers, phones, codecs, routers or switches, and call managers are required for the teleconferencing meeting. In an embodiment, such required elements must be determined to be operational for the TMS to determine that the teleconferencing location is acceptable for executing the meeting.

In an embodiment, the TMS monitors all the elements required for a particular teleconferencing meeting and if any of these required elements are non-operational, then the TMS determines that the meeting cannot be successfully executed at that room location. In response, the TMS reschedules the particular teleconferencing meeting to occur in a different room, and notifies all participants as necessary, so that no teleconferencing meetings are scheduled to take place at an unacceptable location. When non-operational elements are restored to proper operation, the TMS acquires updated status information and can determine that future meetings may be scheduled in the room that was previously determined as unusable.

In an embodiment, for each of the failures as described above, a TMS may determine whether or not one or more teleconferencing meetings should be rescheduled by executing synthetic test calls using synthetic audio and video streams.

Some operational failures may not require a rescheduling of telepresence meetings, due to redundancy in the network. For example, if a call manager fails, phones handled by the failed call manager can fail over to a different call manager. Stackable switches that incorporate redundant switching elements can also handle heavy loads. In an embodiment, the TMS may determine that a particular teleconferencing room element has experienced an operational issue but that there is adequate fallback to alternative physical elements through redundancy or alternatives, and in response, the TMS notifies a TMS administrator, but teleconferencing meetings are not rescheduled.

2.2 Quality Issues

In an embodiment, rescheduling a teleconferencing meeting room is performed automatically in response to detecting one or more quality issues that indicate that holding the meeting as originally scheduled is undesirable. Quality issues may arise when teleconferencing room element is operational, but not performing at a quality level that will allow an acceptable meeting. Examples of quality issues are now described.

In voice-only telecommunications, a mean opinion score ("MOS") determines the quality of a voice-only teleconference call. MOS is widely used in connection with voice-only teleconferencing, but not for video conferences. In an embodiment, a video MOS score ("VMOS") determines the quality of a video teleconference call that includes both audio and video. In an embodiment, a VMOS score includes metrics for jitter, latency, packet loss, and other features of video communications that are not considered in conventional MOS. In an embodiment, the VMOS must be at or above a certain threshold in order to attain a level of confidence regarding the level of quality of video teleconference calls.

In an embodiment, VMOS can be computed using one or more synthetic audiovisual call streams or actual audiovisual call streams to test whether malfunctions will affect the quality of the teleconference call. In an embodiment, the TMS generates a synthetic audio-video stream, and sends the synthetic stream from a router or a codec, or a management station, to an endpoint typically associated with a different teleconferencing room. To determine quality of the synthetic call, the TMS can receive call detail records and call management records from a call manager at the endpoint, or the TMS can initiate a probe in the network to obtain the desired metrics. The TMS can use these metrics to calculate the VMOS value for comparison with a stored threshold VMOS value.

An example VMOS standard for evaluating the quality of a broadcast video network is described in ITU-T recommendation J.144, which describes an objective perceptual video quality measurement process. In an embodiment, the TMS may also use other standards, such as Media Delivery Index (MDI), described in Internet Engineering Task Force (IETF) Request for Comments (RFC) 4445, to evaluate the quality of a network for handling teleconference calls. In an embodiment, the TMS may apply additional metrics or different metrics, or a combination of metrics, including VMOS and MDI, to evaluate video teleconferencing quality. For example, such additional metrics can include packet loss, frame rate, and frame retransmission. Other video quality measurement initiatives include, for example, MSU Perceptual Video Quality tool, and Perceptual Evaluation of Video Quality (PEVQ). The TMS may also monitor a control protocol that indicates network anomalies between teleconference locations, such as Real-Time Control Protocol (RTCP).

2.3 Telepresence Management System with Automatic Room Scheduling

FIG. 1 illustrates an example of a teleconferencing system utilizing automatic room rescheduling. In an embodiment, the system uses an Internet Protocol (IP) network as an underlying communications network. However, embodiments may be used with other kinds of networks.

In FIG. 1, network infrastructure 126 comprises one or more IP network infrastructure elements such as routers and switches. The system has two or more teleconferencing endpoints, and each teleconferencing endpoint may be a source or destination (or both source and destination) of audio and video data. In the example of FIG. 1, the system comprises two teleconferencing endpoints 134, 136. The endpoints 134, 136 are located at teleconference locations where meeting participants may gather to log into and join a teleconferencing meeting. For example, teleconference locations may comprise teleconferencing rooms, although actual physical walls that define a physical room are not necessary in an embodiment. Endpoints 134, 136 may be located at different teleconference rooms, or endpoints 134, 136 may be located at the same teleconference room.

In FIG. 1, a Call Manager Cluster 102 is coupled to network infrastructure 126 and is configured to process teleconference calls. In an embodiment, Call Manager Cluster 102 is a Cisco Unified CallManager cluster, commercially available from Cisco Systems, Inc., San Jose, Calif. However, in some embodiments, Call Manager Cluster 102 may comprise different products with different brand names that perform the functionality and services provided by the Cisco Unified CallManager cluster.

In an embodiment, the Call Manager Cluster 102 comprises a plurality of call managers and each call manager that is part of Call Manager Cluster 102 may handle initial call signaling or call set up for teleconferencing calls. Call managers in Call Manager Cluster 102 receive communications from control devices located at teleconferencing rooms for launching, controlling, and concluding each teleconference call.

In an embodiment, each teleconferencing endpoint 134, 136 has one or more codecs 104, 114. For example, each codec may be a Cisco TelePresence system CTS-1000 or CTS-3000, commercially available from Cisco Systems, Inc., San Jose, Calif. Other embodiments may use other codecs capable of communicating voice and video conference call data. Depending on the particular model, each of the codecs is coupled to one or more microphones, speakers, and video monitors. In the example of FIG. 1, codec 104 is coupled to a microphone, speaker, and video screen 128, and codec 114 is coupled to a microphone, speaker, and video screen 118. A source codec forwards the audio/video stream that represents a meeting participant who is speaking during a meeting. Destination codec(s) receive, process, and send the audio/video streams to corresponding media devices, such as microphone, speaker, and video screen 118, at endpoints.

In an embodiment, each teleconferencing endpoint 134, 136 has an IP phone 116, 120 that functions as a control device. In an embodiment, IP phones 116, 120 may comprise Cisco Unified 7975G IP phones, commercially available from Cisco Systems, Inc., San Jose, Calif. Each IP phone 116, 120 functions as a user interface for launching, controlling, and concluding a teleconference call. In an embodiment, each of the IP phones 116, 120 is registered to a call manager in Call Manager Cluster 102 via communications network 126.

In an embodiment, a Multipoint Conference Unit (MCU) 130 is logically part of network infrastructure 126. The MCU 130 is configured to connect three (3) or more teleconference endpoints to establish a teleconference call for a meeting involving three (3) or more rooms or locations. During a teleconference call, the MCU 130 receives video and audio packets from a codec 104, 114 at an endpoint 134, 136 and distributes the packets to other codecs at other telepresence endpoints. The MCU 130 also receives audio and video packets from the other codecs at the other telepresence endpoints and forwards the received audio and video packets to the destination codec.

In an embodiment, switches 132, 138 are coupled to network infrastructure 126 and located in endpoints 134, 136. Switches 132, 138 at endpoints 134, 136 perform the Layer 2 function of broadcasting Ethernet frames to reach the appropriate destination within the domain of the switch.

In an embodiment, one or more Meeting Scheduling Components (MSCs) 122 are coupled to network infrastructure 126. Each of the MSCs 122 can be hosted on any computer that is connected to the network infrastructure 126. In an embodiment, the MSCs 122 are not located in a teleconference room.

In an embodiment, MSCs 122 include one or more of a MICROSOFT OUTLOOK Client 106, a directory such as MICROSOFT ACTIVE DIRECTORY 108, MICROSOFT EXCHANGE 110, and Cisco TelePresence Manager (CTM) 112. Although specific brands and products are shown as examples in FIG. 1, in some embodiments a system may use other combinations of brands and products. For example, the directory may comprise any X.500 directory or a Lightweight Directory Access Protocol (LDAP) server. In some embodiments, any combination of different units may provide the functions and services of MICROSOFT OUTLOOK Client 106, MICROSOFT ACTIVE DIRECTORY 108, MICROSOFT EXCHANGE 110, or CTM 112.

In an embodiment, CTM 112 is middleware that operationally ties together a call manager, teleconference room endpoints registered to the call manager, and meeting participants' calendaring software. Prospective meeting participants reserve teleconference rooms via the calendaring software. For example, such calendaring software may be an meeting scheduling application already familiar to prospective meeting participants, such as Microsoft Outlook. The calendaring software may also be a Web browser, for example. The calendaring software interacts with CTM 112 to reserve teleconference rooms. CTM 112 thereby manages the scheduling of teleconference rooms. CTM 112 also enables a single touch teleconference start-up via the 7975G IP phone in the teleconference room. When meetings are scheduled, CTM 112 automatically invokes a mail transfer agent to send the prospective meeting participants one or more e-mails regarding details of a scheduled teleconference call.

For example, a prospective meeting participant may initiate the scheduling of a telepresence meeting by using the calendaring software at a computer accessible to the prospective meeting participant. The calendaring software communicates with CTM 112, which may comprise an HTTP server and one or more web-based program applications. The prospective meeting participant may view the available times for teleconferencing rooms and may select one of the available times and rooms. Thus, CTM 112 is a source of teleconference room availability information. The prospective meeting participant can, through the calendaring software, cause CTM 112 to create and store a record representing a reservation of a particular room in a particular building or other location on a particular day and time.

For simplicity of illustration, a single set of MSCs 122 is shown in FIG. 1. However, in some embodiments, a system may have more than one set of MSCs 122. Although specific brands and products are provided herein as examples, embodiments of the invention are not limited to the specific brands and products described herein. Other brands and other products may, in some embodiments, provide functionality similar to the functionality of the brands and products described herein.

In FIG. 1, TMS 124 as described above in section 2.0 monitors and manages the infrastructure and the applications of teleconferencing endpoints 134, 136 for the successful execution of telepresence meetings. TMS 124 is connected to the network infrastructure 126 and monitors all the components of the endpoints 134, 136, but the TMS 124 may physically be located anywhere.

Figure 3:
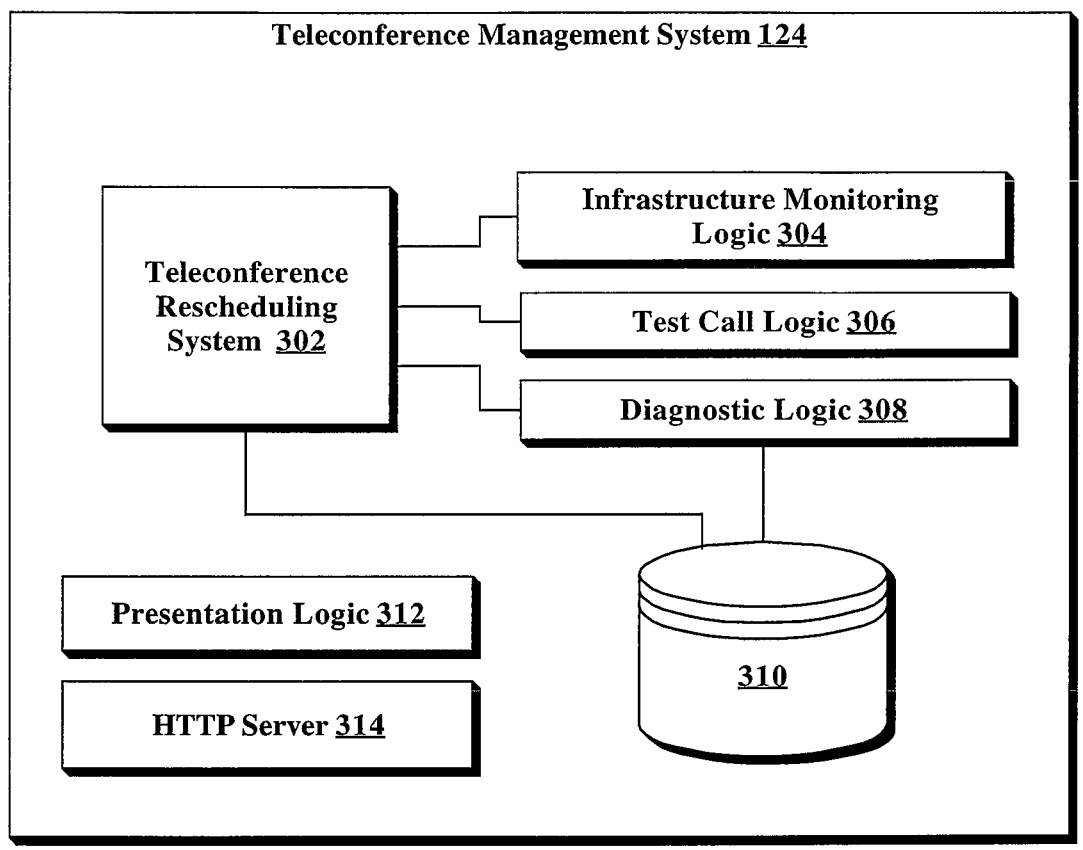
FIG. 3 illustrates an example teleconferencing management system.

FIG. 3 illustrates an example teleconferencing management system. In an embodiment, TMS 124 comprises teleconference rescheduling system (TRS) 302, which contains logic for automatic room rescheduling. TMS 124 further comprises infrastructure monitoring logic 304 that is configured to monitor the network infrastructure 126. TMS 124 further comprises test call logic 306 that performs synthetic test calls. TMS 124 further comprises diagnostic logic 308 that actively performs other diagnostics, and communicates with CTM 112 to learn which teleconferencing meetings are impacted by faults in the elements of endpoints 134, 136. Diagnostic logic 308 is coupled to test call logic 306 and configured to periodically command the test call logic to perform one or more synthetic calls and provide result metrics.

In an embodiment, TMS 124 may oversee all the teleconferencing rooms of an enterprise, such as endpoints 134, 136. In an embodiment, TMS 124 determines which rooms and meetings are negatively affected by operational issues or quality issues, and TRS 302 determines appropriate rescheduling of rooms for the meetings that are affected. TMS 124 uses stored information about rooms that are not impacted by operational issues or quality issues to reschedule the negatively affected telepresence meetings. Status data about elements of endpoints 134, 136, results of test calls and diagnostics, and other monitoring data may be stored in a database 310 that is coupled to TMS 124 and accessible to TRS 302.

In an embodiment, TMS 124 retrieves room and meeting schedule data about impacted teleconferencing meetings from CTM 112 in response to detecting that operational issues or quality issues are severe enough to negatively affect the suitability of using a room for meetings. In an embodiment, TMS 124 uses VMOS to determine whether operational issues or quality issues surpass one or more stored thresholds such that meetings scheduled for the room should be rescheduled. In an embodiment, in response to determining that operational issues or quality issues exceed threshold(s), TMS 124 is configured to: 1) retrieve a list of meetings scheduled for the affected room from CTM 112, 2) identify one or more alternative rooms that are available using CTM 112, and which one of the rooms is best for the known meeting participants, and 3) reserve the best alternative room through CTM 112. In an embodiment, TMS 124 may issue a notification message or warning message to the meeting participants prior to reserving a new room, or may obtain approval from one or more meeting participants prior to canceling the affected room and reserving the alternative room. In some embodiments, TMS 124 only notifies meeting participants that the room is not suitable for a meeting and may include reasons why the room is not suitable for the meeting.

TMS 124 may be hosted on a single computer or network device connected to the network infrastructure 126, or in other embodiments the TMS may be implemented using multiple physical computers or devices. In other embodiments, a system may replicate TMS 124 to create multiple TMSs.

2.4 Monitoring and Management

In an embodiment, TMS 124 collects and aggregates data from elements of endpoints 134, 136. TMS 124 collects performance data, availability information, room location/profile information and participant profile information.

2.4.1 Performance Data

In an embodiment, TMS 124 continuously collects performance data from network elements and other devices at endpoints 134, 136. Using infrastructure monitoring logic 304, performance data is collected and analyzed to determine whether a particular endpoint has operational issues or quality issues. Ongoing meetings are monitored for quality issues and operational issues. Infrastructure monitoring logic 304 may be configured to determine the various routes between endpoints and network infrastructure elements that form the routes to identify possible causes for present or potential quality issues or operational issues.

TMS 124 also uses test call logic 306 to perform one or more synthetic test calls to validate that network conditions are satisfactory for transporting data relating to meetings along paths between endpoints. In an embodiment, an administrator can set up periodic synthetic test calls that can run, for example, every 15 minutes during business hours. On-demand diagnostics are also possible when a meeting participant complains that their teleconference call suffers from bad quality.

In an embodiment, infrastructure monitoring logic 304 automatically collects performance data, performs analysis and monitoring, and places synthetic test calls, based on configuration settings at TMS 124. For example, TMS 124 monitors and analyzes a default set of data, and an administrator can specify additional data to monitor and analyze. For example, TMS 124 may comprise an HTTP server 314 and presentation logic 312 so that an administrator can communicate with the TMS using a browser to set the configuration settings. In an embodiment, after the configuration settings are set, TMS 124 can run independently without intervention.

2.4.2 Resource Availability Information

In an embodiment, TMS 124 collects resource availability information in a variety of ways from the elements of endpoints 134, 136. The resource availability information reflects the availability of the resources required for a teleconferencing meeting. In an embodiment, the resources that TMS 124 monitors for availability include MICROSOFT EXCHANGE 110 and MICROSOFT ACTIVE DIRECTORY 108, to obtain information about the availability of physical rooms. TMS 124 also performs resource availability monitoring for codecs 104 and 114, to obtain data indicating availability of specific components in a room, such as microphones, video screens, and speakers. TMS 124 also performs resource availability monitoring for CTM 112, MCU 130, and switches 132, 138. In an embodiment, all components within the system of FIG. 1 are monitored.

TMS 124 communicates with elements of the endpoints 134, 136 using protocols and mechanisms supported by the network device. The communication can be used to test the availability of services provided by the network devices involved in the telepresence deployment. For example, the network devices may support SNMP or have an API for providing availability information. The network devices may also communicate using Windows Management Instrumentation (WMI) if the components are MICROSOFT WINDOWS-based. For example, over SNMP the TMS 124 can obtain, from CTM 112, management information base (MIB) object values or MIB table values providing status information regarding the connectivity between CTM 112 and codecs 104, 114. Codecs 104, 114 are connected through the network infrastructure 126 to CTM 112. Codec 104 can also provide data regarding the connectivity and operational status of the attached microphones, speakers and video screens 128, and codec 114 can also provide data regarding the connectivity and operational status of the attached microphones, speakers and video screens 118. CTM 112 manages a schedule of rooms and call reservations, and MICROSOFT EXCHANGE 110 can provide schedule data from calendar records stored in the EXCHANGE data repository.

In an embodiment, TMS 124 is configured with stored data indicating which entity in the system 100 can provide useful information. For example, TMS 124 is configured with a knowledge base that comprises information about the network infrastructure 126, a list of endpoints, an inventory of elements in endpoints 134, 136, an inventory of elements in MSC 122, and the logical configuration of the system 100, and the connections or association between various components. For example, TMS 124 is configured to enable retrieving room information from CTM 112. CTM 112 stores locations of rooms including physical addresses of buildings and locations within buildings, and stores data indicating the capability of the rooms, for example, whether a room has one video screen or three video screens. In an embodiment, TMS 124 communicates with CTM 112 or MICROSOFT EXCHANGE 110 to obtain room reservation and availability data from stored scheduling records or calendar records. In an embodiment, TMS 124 communicates with MICROSOFT ACTIVE DIRECTORY 108 for information regarding users and names, campus locations with teleconference rooms, and locations of certain network elements. In an embodiment, TMS 124 communicates with a call manager in Call Manager Cluster 102 to retrieve information regarding phone extensions for phones in rooms.

In an embodiment, infrastructure monitoring logic 304 performs discovery processes to obtain network infrastructure information, such as what network devices are a part of the network infrastructure 126 and endpoints 134, 136, and what network devices ought to be monitored between the endpoints. In an embodiment, TMS 124 can use discovery protocols to discover network devices and query discovered devices for the status of the devices. For example, TMS 124 can use Cisco Discovery Protocol (CDP), SNMP GET requests, or ping to obtain status information for devices. In an embodiment, since TMS 124 can directly obtain status information for such network devices, TMS 124 does not need to retrieve such status information from any other particular component. Alternatively, TMS 124 can obtain device inventory data and device status data from a separate network management system (NMS) that is responsible to perform discovery and maintain the inventory and status data.

In an embodiment, TMS 124 also discovers the network paths through which media packet traffic flows between endpoints. In an embodiment, elements at the endpoints 134, 136 do not store path data. Thus, TMS 124 may be configured to verify that the network elements in the network path are functioning properly or to identify quality issues or operational issues.

2.4.3 Room Location and Size Information.

In an embodiment, TMS 124 retrieves information regarding the location of teleconferencing rooms and the number of participants for scheduled meetings. Room location and meeting size information may be used to determine how the participants are impacted by moving the meeting location during rescheduling. For example, for a meeting of six (6) participants at one room, TMS 124 can move the six participants to a new room that may hold 18 participants. However, TMS 124 cannot move the six participants to a new room that can only hold three participants. In an embodiment, TRS 302 is configured to match, as closely as possible, a new room to the number of meeting participants that are scheduled for the original room.

In an embodiment, in performing rescheduling, TRS 302 selects a new room based in part by the distance of participants to the new room and travel times for the participants to reach the new room. Thus, TRS 302 attempts to select a room that will allow the participants enough time to travel or more from the originally scheduled room to the rescheduled room. In an embodiment, this physical location information for the teleconferencing rooms is obtained from MICROSOFT ACTIVE DIRECTORY 108. For example, MICROSOFT ACTIVE DIRECTORY 108 can populate a database storing room information as the rooms are deployed throughout the enterprise. In an embodiment, TRS 302 selects a new room by choosing a room that is closest to the originally scheduled room. For example, the new room selected is the shortest distance away from the originally scheduled room.

In an embodiment, TMS 124 uses the street address or GPS coordinates of teleconferencing rooms to identify physical locations of possible newly scheduled rooms. An interface to an online mapping system may be used to determine the fastest route to the proposed new meeting location and an approximate distance and time for participants to reach the changed meeting location or between an originally scheduled room and a rescheduled room. In an embodiment, the interface is the HTTP protocol.

In an embodiment, TMS 124 may comprise one or more selection rules, and use such rules with location information for determining the best choices for selecting a rescheduled room and for estimating any additional time required to arrive on time for a meeting. For example, TMS 124 is configured with travel rules to account for congested traffic areas, periods of rush hour, shuttle bus or public transportation schedules, or parking availability.

2.4.4 Participant Profile Information

In an embodiment, TMS 124 may obtain information regarding meeting participants from MICROSOFT EXCHANGE 110 and MICROSOFT ACTIVE DIRECTORY 108, or through other network elements that can provide participant profile information. In an embodiment, participant profile information may comprise names or user identifiers of meeting participants, one or more temporally adjacent meetings that the participants are scheduled to attend, and the participant's title or entitlement status.

In an embodiment, TMS 124 may use the information indicating temporally adjacent meetings to find the best location to accommodate the participants if the participants have meetings directly before or after the meeting being rescheduled. Thus, if 3 of 4 participants are scheduled to meet at Building A at 1:00 PM, then it will be convenient for the same participants to meet at Building A or Building B, which is next door, at 2:00 PM. Additionally or alternatively, TMS 124 uses the information indicating temporally adjacent meetings to notify a participant that the location of a rescheduled room may require additional time to reach the temporally adjacent meetings in time.

TMS 124 may optionally provide telephone dial-in call bridge information for participants in transit, in situations where a change in location occurs close to the meeting start time. Consequently, when a meeting participant cannot reach a rescheduled room location before the meeting start time, the meeting participant optionally may participate by telephone or mobile phone using the dial-in bridge information.

In an embodiment, TMS 124 may use the title information or entitlement information if no rooms are available for the time at which a meeting is scheduled. TMS 124 may use the title information to prioritize or reschedule meetings for participants of a lower entitlement status and require the participants of a lower entitlement status to choose an alternate time or room location. For example, sales briefings with customers may take priority over engineers having routine discussions. As another example, a CEO may have a higher entitlement status to use a room over anyone else. TMS 124 allows a TMS administrator to specify such entitlement status to determine which parties have access to a teleconferencing room. In an embodiment, entitlement data specifies whether meeting participants are entitled to use particular teleconference locations. If no locations are available for rescheduling a teleconference call at a particular time, the entitlement data may be used to determine whether the participants are required to select a different time.

In an embodiment, a meeting may be considered privileged, and if the privileged meeting is rescheduled, then the privileged meeting must be rescheduled for the same time as the currently scheduled time of the privileged meeting. Non-privileged meetings are meetings that are not considered privileged, and may be rescheduled, as necessary, so that a privileged meeting may take priority in using a room. In an embodiment, a meeting is privileged if any of the meeting participants is an executive, such as a CEO, or a customer.

2.5 Rescheduling Process Examples

Figure 2:
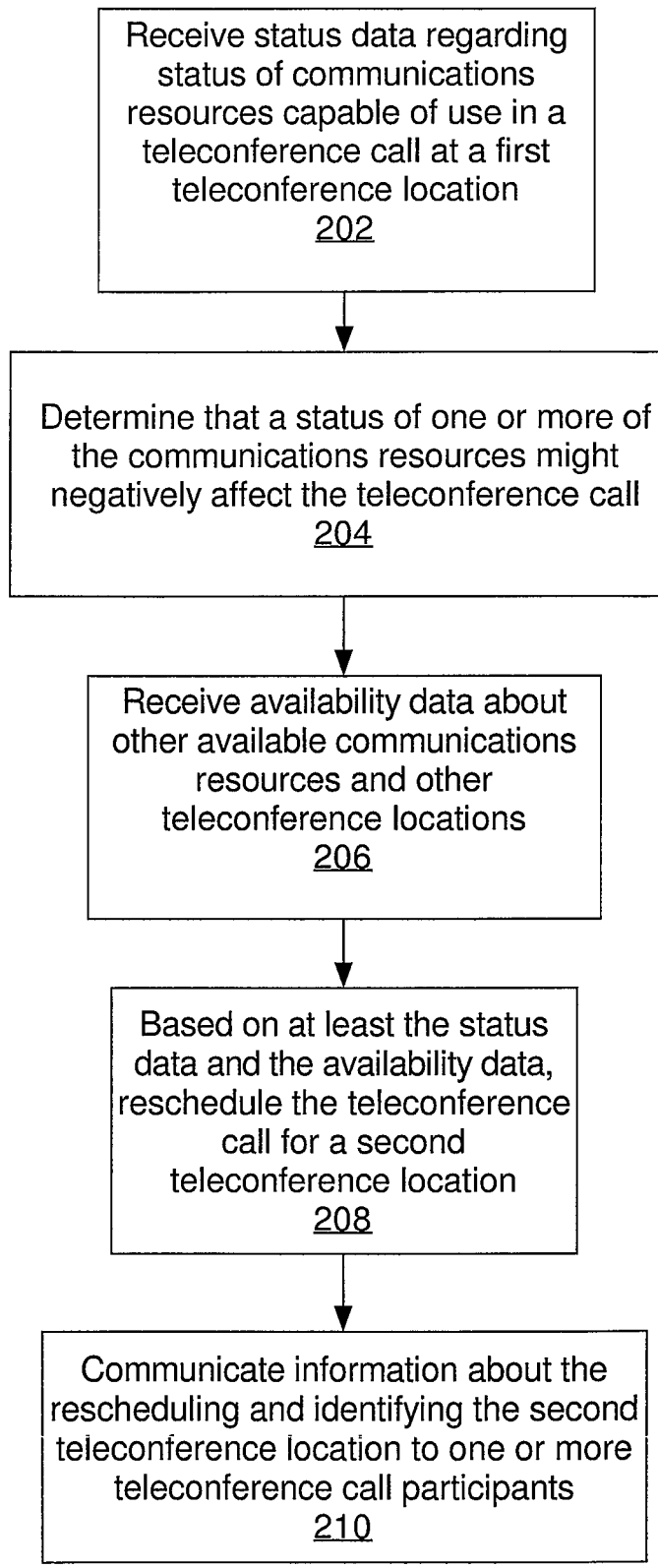
FIG. 2 is a flow diagram illustrating a technique for automatically rescheduling teleconferencing meetings.

FIG. 2 is a flow diagram illustrating automatically rescheduling meetings. For purposes of illustrating a clear example, FIG. 2 is described herein in the context of FIG. 1, but the approach of FIG. 2 is broadly applicable to many other contexts. In an embodiment, the steps depicted in FIG. 2 may be performed by TMS 124. In some embodiments, other entities may perform the steps depicted in FIG. 2. In some embodiments, the steps in FIG. 2 may be performed in an order other than the order indicated in FIG. 2. In some embodiments, not all the steps depicted in FIG. 2 will be performed or further steps may be performed in addition to those steps depicted in FIG. 2.

In FIG. 2, status data regarding status of communications resources capable of use in a teleconference call at a first teleconference location is received at step 202. For example, TMS 124 receives operational status data regarding IP phone 116, switch 138, codec 104, video, microphone, and speaker 128 at endpoint 134.

A determination that a status of one or more of the communications resources might negatively affect the teleconference call is made at step 204. For example, TMS 124 detects a quality issue or an operational issue in the system of FIG. 1 or in a particular video teleconferencing room or endpoint. Step 204 also may involve determining that a quality issue or operational issue requires rescheduling meetings associated with a video teleconferencing room that is associated with the quality issue or operational issue. Any of the monitoring, diagnostic, and testing techniques that have been previously described may be used to determine that a quality issue or operational issue exists, and to determine that the issue exceeds a specified threshold above which a rescheduling operation is appropriate.

Availability data about other available communications resources and other teleconference locations is received at step 206. For example, TMS 124 receives availability data regarding teleconference location 136, IP phone 120, codec 114, video, microphone, and speaker 118, and switch 132.

At step 208, based on at least the status data and the availability data, the teleconference call is rescheduled for a second teleconference location. For example, TMS 124 reschedules a meeting that was originally scheduled for endpoint 134, so that the rescheduled meeting will now be held at endpoint 136. Under certain circumstances, a rescheduling may be unnecessary. If, for example, endpoint 134 and endpoint 136 are at the same teleconference room, a rescheduling is not performed. If each of endpoint 134 and endpoint 136 are located in a separate teleconference room, then a rescheduling is made. In an embodiment, TMS 124 reschedules the meetings in coordination with CTM 112 in step 210.

At step 210, information about the rescheduling is communicated to one or more teleconference call participants, and the second teleconference location is identified to one or more teleconference call participants. For example, TMS 124 provides one or more notifications to participants in the meeting that was originally scheduled for endpoint 134.

Figure 4:
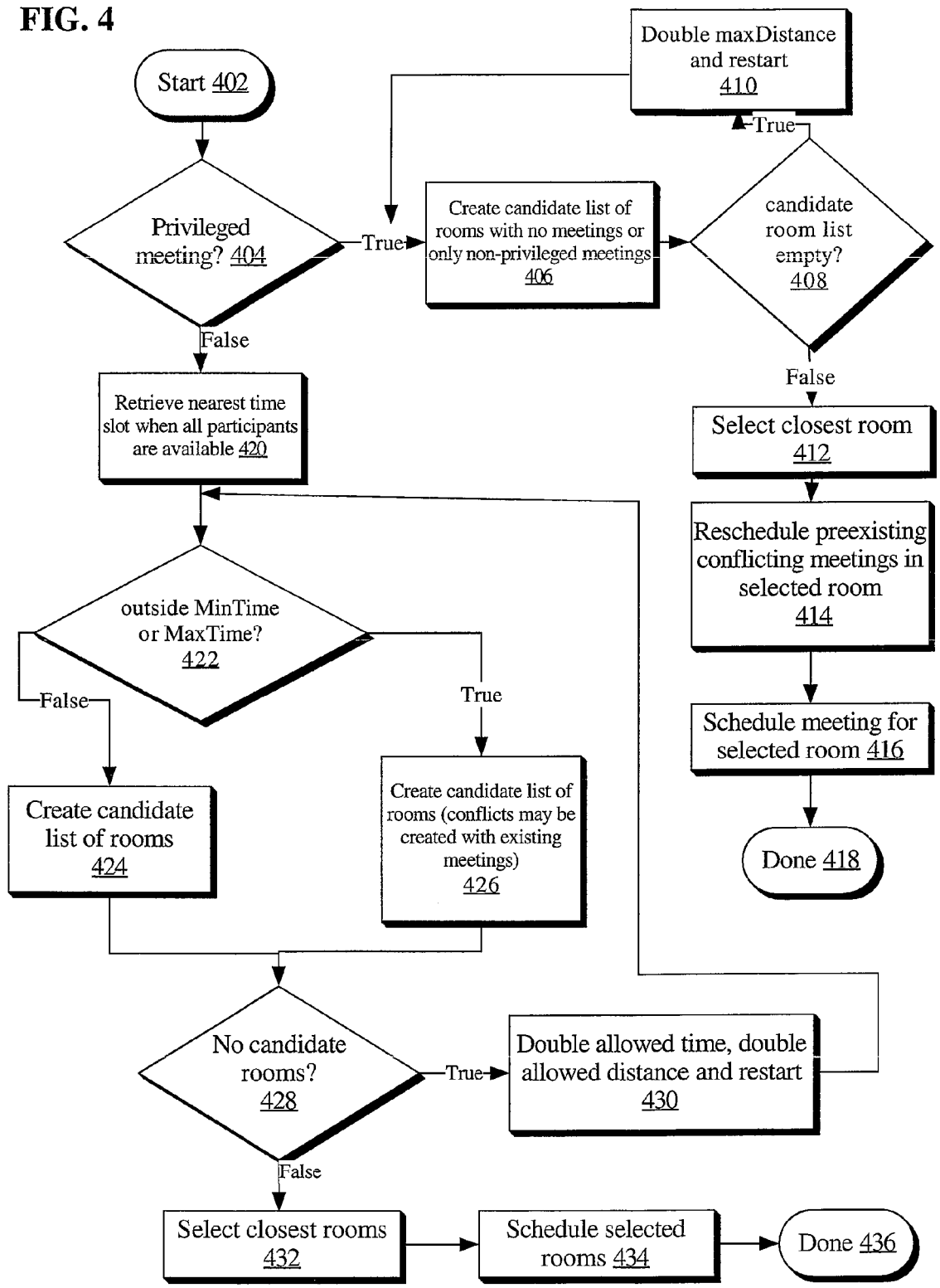
FIG. 4 illustrates a process of rescheduling teleconferencing rooms.

FIG. 4 illustrates a process of rescheduling teleconferencing rooms. In an embodiment, the steps depicted in FIG. 4 may be performed by TMS 124. In some embodiments, other entities may perform the steps depicted in FIG. 4. In some embodiments, the steps in FIG. 4 may be performed in an order other than the order indicated in FIG. 4. In some embodiments, not all the steps depicted in FIG. 4 will be performed or further steps may be performed in addition to those steps depicted in FIG. 4.

In step 402, TMS 124 begins the process of rescheduling a meeting. In step 404, TMS 124 determines whether the meeting to be rescheduled is privileged. Privileged meetings will not be rescheduled for different times. If the meeting is privileged, in step 406 TMS 124 creates a list of candidate rooms that may host the meeting at the currently scheduled time of the meeting. The list contains only rooms that have either no meetings or have only non-privileged meetings at the currently scheduled time of the meeting.

In step 408, TMS 124 examines whether the candidate room list is empty. If the candidate room list is empty, in step 410 TMS 124 doubles the value of the maximum allowable distance between rooms (denoted maxDistance in FIG. 4, but other labels may be used) and restarts the process starting from step 406.

If the candidate room list is not empty, then in step 412 TMS 124 selects the closest room. In step 414, TMS 124 reschedules any pre-existing conflicting meetings in the selected room. The pre-existing conflicting meetings are non-privileged, because rooms that are already scheduled for other privileged meetings at the currently scheduled time of the meeting will not be in the candidate room list. In step 416, TMS 124 schedules the meeting for the selected room. In step 418, TMS 124 is finished rescheduling the privileged meeting. The meeting participants are notified of the new room.

If the meeting to be rescheduled is not a privileged meeting, in step 420 TMS 124 retrieves the earliest time when all participants to the meeting are available. In step 422, TMS 124 determines whether the difference in time between the earliest time and the currently scheduled time of the meeting is outside the minimum allowed time difference (denoted minTime in FIG. 4 as an example) or outside the maximum allowed time difference (denoted maxTime in FIG. 4 as an example). If the time slot is within both the minimum allowed time difference and the maximum allowed time difference, in step 424 TMS 124 creates a candidate list of rooms. Only those rooms within the maximum allowed separation distance are included in the candidate room list. Processing continues in step 428.

If the time difference between the time slot and the currently scheduled time of the meeting exceeds the minimum allowed time difference or exceeds the maximum allowed time difference, in step 426 TMS 124 creates a candidate list of rooms that may be selected as the replacement room, within the minimum or maximum allowed time difference. However, some of the meeting participants may then have conflicts with existing meetings, and should be notified if the room ultimately selected affects those meeting participants' other conflicting meetings. Processing continues in step 428.

In step 428, TMS 124 determines whether the candidate room list is empty. If the candidate room list is empty, then in step 430 TMS 124 doubles the allowed time and doubles the allowed distance, then restarts the process at step 422.

If the candidate room list is not empty, in step 432 TMS 124 selects the closest room as the newly selected room to hold the meeting. In an embodiment, TMS 124 finds the closest room by interfacing with an online map service to compute the physical distance from the location of the currently scheduled room to each of the candidate rooms. In an embodiment, the time to travel from the currently scheduled room to each of the candidate rooms is a factor in determining the closest room.

In step 434, TMS 124 schedules the meeting at the newly selected room, at a new time at which the room is available. In step 436, TMS 124 is finished rescheduling the non-privileged meeting. The meeting participants are notified of the new room and time.

2.6 Example Pseudocode for Rescheduling Process Example

In an embodiment, the process generally described above for FIG. 4 may be implemented in logic in one or more computer programs, other software elements, firmware, digital logic, or in a special-purpose computer that is configured to perform as described in the following pseudo code.

---

```
Inputs:
currScheduledTime: Currently scheduled date and time of the meeting
currRoom: Currently scheduled meeting room
currLocation: Location of the currently scheduled meeting room
endpoints: Number of endpoints
minTime: minimum allowable time difference between old time of
   meeting and new time of meeting in hours (default to 1)
maxTime: Maximum allowable time difference between old time of
   meeting and new time of meeting in hours (default to 48)
maxDistance: Maximum allowable distance between old location and
   new location (default to 4 miles)
privilegedMeeting: can be set to true/false. In an embodiment, set
   to true if this meeting involves customers and/or VPs or above.
   (Defaults to false).
particpants: List of affected participants in the meeting
/*
The assumptions in the process are as follows. In the case of a
privileged meeting, it is assumed that there is no flexibility with
respect to the time, i.e., maxTime is set to 0. For example, if
customers are present in meetings, prior commitments cannot be
retracted. Also, if VPs and executive management are present, it is
highly unlikely that their schedules are flexible enough to
accommodate alternative times without large repercussions. And
given that there is no flexibility in the time in such cases, the
location of the new room must be close to the location of the old
room in order to minimize transportation time to the new room. In
such cases, it is possible that an existing meeting will be altered
in order to accommodate such stringent constraints.
*/
/*
The process uses the following simple function to determine the
list of candidate rooms
*/
addCandidateRoom (Room rLocation, Location currLocation, List
clist) {
   Compute physical distance d from currLocation to location of
   room r by interfacing with an online map application like
   Google Maps (or equivalent)
   if (d > maxDistance)
       skip this room, and go to the next room in the list
   else
       Add room r to a list of candidate rooms clist along with
distance computation d
}
/*
This is the main process
*/
if (privilegedMeeting) {
   set maxTime = 0
   Gather a list L of all rooms with equivalent number of
   endpoints. In an embodiment, retrieve this information from
   Cisco Telepresence Manager or Microsoft Exchange Server
   Initialize candidate list of rooms clist to <null>
   for each room r in list L {
       if a privileged meeting is scheduled in room r at
       currScheduledTime, skip this room and go to the next room
       in this list
       Get street address information rLocation for room r from
       organization's LDAP server (or equivalent)
       /* Add room to candidate list if it satisfies the
distance criterion */
       addCandidateRoom(rLocation, currLocation, clist);
   }
   if clist is empty {
       set maxDistance = maxDistance *2 // double the search
distance
       restart this process
   }
   Select candidate room r from clist such that distance d
   associated with this room is the minimum in clist
   If a meeting is scheduled in room r at currScheduled time,
```

-continued

```
    invoke this process with a new set of parameters to reschedule
    that meeting.
    Schedule the current meeting at currScheduledTime in room r
    Exit this process
}
/*
The rest handles the case where this meeting to be rescheduled is
not a privileged meeting
*/
Determine the nearest time slot t when all participants are free.
In an embodiment, determining the nearest time slot t when all
participants are free is performed by interfacing with Microsoft
Exchange Server
if ((t – currScheduledTime) > maxTime) or ((t – currScheduledTime)
< min Time) {
    // This flow addresses the case where all affected
    participants are free at a time that is
    // beyond the stated time constraints. In this case, the
    process will select a room at a
    // time that is within the stated constraints, but will result
    in some participants having a
    // conflict with an existing meeting.
    // Expand the search space if necessary to find the
    appropriate room
    Gather a list L of all rooms with equivalent number of
    endpoints. In an embodiment, list L is created by interfacing
    with Cisco Telepresence Manager or Microsoft Exchange Server
    for each room r in list L {
        if room r is available at a time tr that satisfies
    maxTime and minTime constraints {
            Get street address information rLocation for room r
            from organization's LDAP server (or equivalent)
            addCandidateRoom(rLocation, currLocation, clist);
        }
    }
} else {
    // This flow in the else clause addresses the case where all
    // affected participants are available at a time that
    // satisfies the required time constraints as specified by
    minTime and maxTime. In this
    // case, the process will search for a room that accommodates
    all participants,
    // expanding the search space if necessary to find the
    appropriate room
    Gather a list L of all rooms with equivalent number of
    endpoints. In an embodiment, list L is created from Cisco
    Telepresence Manager or Microsoft Exchange Server
    for each room r in list L f
        if room r is available at time t such that ((t –
        currScheduledTime) < maxTime) and ((t –
        currScheduledTime) > minTime) f
            Get street address information for room r from
            organization's LDAP server (or equivalent)
            Compute physical distance d from currLocation to
            location of room r by interfacing with a map
            application. In an embodiment, this map application
            can be Google Maps
            if (d > maxDistance)
                skip this room, and go to the next room in the
list
            else
                Add room r to a list of candidate rooms clist
                along with distance computation d and time tr
                when room is available
        }
    }
}
if clist is empty {
    set maxDistance = maxDistance *2 // double the search
distance
    set minTime = minTime *2 // double the minimum time required
to reach the new location
    restart this process
}
Select candidate room r from clist such that distance d associated
with this room is the minimum in clist
Set newScheduledTime = time tr at which room r is available
Schedule the current meeting at newScheduledTime in room r. In an
embodiment, scheduling the current meeting at newScheduledTime in
```

-continued

```
room r may be performed by interfacing with Microsoft Exchange
Server
Exit this process.
```

3.0 IMPLEMENTATION MECHANISMS

Hardware Overview

Figure 5:
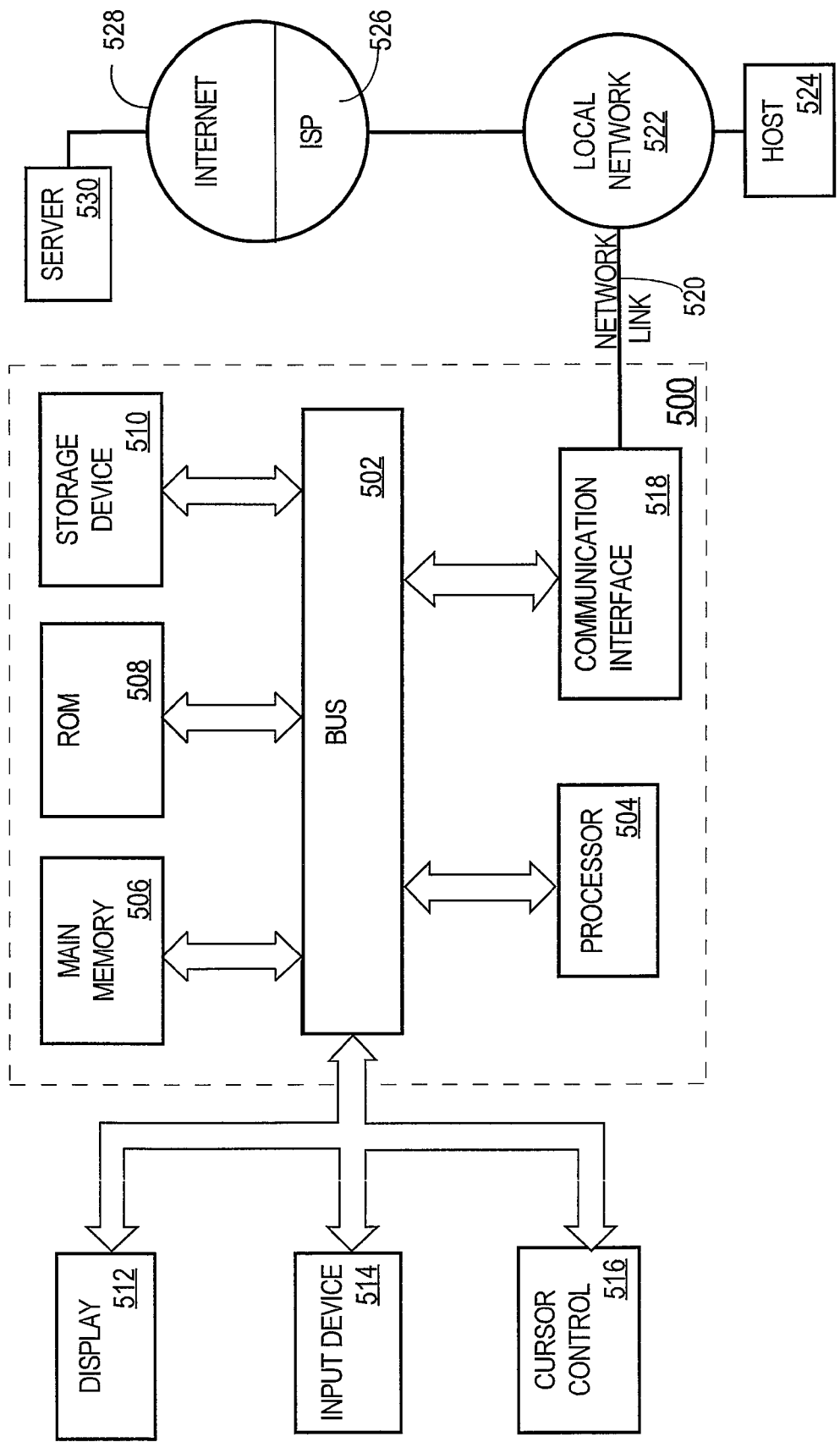
FIG. 5 illustrates a computer system upon which an embodiment may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to storage media and transmission media. Storage media includes both non-volatile media and volatile media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

4.0 EXTENSIONS AND ALTERNATIVES

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus comprising:
   a network interface;
   a processor coupled to the network interface;
   a computer-readable volatile or non-volatile medium comprising one or more stored sequences which, when executed by the processor, cause the processor to carry out:
   receiving status data regarding status of communications resources capable of use in a teleconference call at a first teleconference room location;
   determining that a status of one or more of the communications resources might negatively affect the teleconference call;
   receiving availability data about other available communications resources and other teleconference room locations;
   determining, from an online mapping system, a distance between the first teleconference room location and other teleconference room locations;
   based on at least the status data, the distance between first teleconference room location and other teleconference room locations and the availability data, rescheduling the teleconference call for a second teleconference room location that is closest to the first teleconference room location; and
   communicating information about the rescheduling and identifying the second teleconference room location to one or more teleconference call participants.

2. The apparatus of claim 1, wherein the computer-readable medium further comprises additional stored sequences which, when executed by the processor, cause the processor to carry out:
   retrieving participant information identifying work locations of the participants; and
   performing the rescheduling using the participant information.

3. The apparatus of claim 1, wherein the computer-readable medium further comprises additional stored sequences which, when executed by the processor, cause the processor to carry out:
   retrieving meeting data identifying other meetings that are scheduled as temporally adjacent to the teleconference call; and using the meeting data in the rescheduling to select the second teleconference room location.

4. The apparatus of claim 1, wherein the computer-readable medium further comprises additional stored sequences which, when executed by the processor, cause the processor to carry out:
retrieving entitlement data specifying whether the participants are entitled to use particular teleconference room locations; and
in the rescheduling, if no locations are available for the teleconference call at a particular time, using the entitlement data to determine whether the participants are required to select a different time.

5. The apparatus of claim 1, wherein the instructions which when executed cause the determining further comprise instructions which when executed cause executing synthetic test calls to test the communications resources.

6. The apparatus of claim 1, wherein the availability data further includes status indicators for microphones, video screens, and speakers of the available teleconference room locations.

7. The apparatus of claim 1, wherein the instructions which when executed cause determining further comprise instructions which when executed cause monitoring ongoing teleconference calls for quality conditions and error conditions.

8. The apparatus of claim 1, wherein the instructions which when executed cause the rescheduling further comprise instructions which when executed cause using a number of the teleconference participants in the rescheduling.

9. The apparatus of claim 1, wherein the computer-readable medium further comprises additional stored sequences which, when executed by the processor, cause the processor to carry out:
communicating dial-in information to the participants when the rescheduling occurs close to a starting time of the teleconference call.

10. The apparatus of claim 1, wherein the teleconference call is a video teleconference and the first teleconference room location is a first video teleconference room and the second teleconference room location is a second video teleconference room.

11. A method comprising computer-implemented steps of:
receiving by a teleconference management system status data regarding status of communications resources capable of use in a teleconference call at a first teleconference room location;
determining by the teleconference management system that a status of one or more of the communications resources might negatively affect the teleconference call;
receiving by the teleconference management system availability data about other available communications resources and other teleconference locations;
determining, by the teleconference management system from an online mapping system, a distance between the first teleconference location room and other teleconference room locations;
based on at least the status data, the distance between first teleconference room location and other teleconference room locations and the availability data, rescheduling by the teleconference management system the teleconference call for a second teleconference room location that is closest to the first teleconference room location; and
communicating by the teleconference management system information about the rescheduling and identifying the second teleconference room location to one or more teleconference call participants.

12. A method as recited in claim 11, further comprising:
retrieving participant information identifying work locations of the participants; and
performing the rescheduling using the participant information.

13. A method as recited in claim 11, further comprising:
retrieving meeting data identifying other meetings that are scheduled as temporally adjacent to the teleconference call; and
using the meeting data in the rescheduling to select the second teleconference room location.

14. A computer-readable non-transitory medium carrying one or more sequences of instructions, which instructions, when executed by one or more processors, cause the one or more processors to carry out steps of:
receiving by a teleconference management system status data regarding status of communications resources capable of use in a teleconference call at a first teleconference room location;
determining by the teleconference management system that a status of one or more of the communications resources might negatively affect the teleconference call;
receiving by the teleconference management system availability data about other available communications resources and other teleconference room locations;
determining, by the teleconference management system from an online mapping system, a distance between the first teleconference room location and other teleconference room locations;
based on at least the status data, the distance between first teleconference room location and other teleconference room locations and the availability data, rescheduling by the teleconference management system the teleconference call for a second teleconference room location that is closest to the first teleconference room location; and
communicating by the teleconference management system information about the rescheduling and identifying the second teleconference room location to one or more teleconference call participants.

15. A computer-readable non-transitory medium as recited in claim 14, further comprising instructions which, when executed by the one or more processors, cause the one or more processors to perform retrieving participant information identifying work locations of the participants; and performing the rescheduling using the participant information.

* * * * *